US012379566B2

(12) United States Patent
Cheng et al.

(10) Patent No.: US 12,379,566 B2
(45) Date of Patent: Aug. 5, 2025

(54) OPTICAL ELEMENT DRIVING MECHANISM (71) Applicant: TDK CORPORATION, Tokyo (JP)

(72) Inventors: Pai-Jui Cheng, Taoyuan (TW); Shu-Shan Chen, Taoyuan (TW)

(73) Assignee: TDK CORPORATION, Tokyo (JP)

( * ) Notice: Subject to any disclaimer, the term of this patent is extended or adjusted under 35 U.S.C. 154(b) by 603 days.

(21) Appl. No.: 17/835,297

(22) Filed: Jun. 8, 2022

(65) Prior Publication Data

US 2023/0400660 A1    Dec. 14, 2023

(51) Int. Cl.
*G02B 7/02*    (2021.01)

(52) U.S. Cl.
CPC ............. *G02B 7/022* (2013.01); *G02B 7/023* (2013.01)

(58) Field of Classification Search
CPC ............ G02B 7/003–005; G02B 7/023; G02B 7/04–105; G02B 7/14–16; G02B 7/00–40; G02B 7/002; G02B 7/02–16; G02B 7/022
See application file for complete search history.

(56) References Cited

U.S. PATENT DOCUMENTS

| | | | | |
|---|---|---|---|---|
| 5,592,335 A | * | 1/1997 | Omi | G02B 7/102 359/740 |
| 2001/0026112 A1 | * | 10/2001 | Yoshida | G03B 3/10 310/317 |
| 2005/0062346 A1 | * | 3/2005 | Sasaki | G02B 7/102 310/323.05 |
| 2020/0225442 A1 | * | 7/2020 | Weng | H04N 23/54 |
| 2020/0409015 A1 | * | 12/2020 | Kim | G03B 3/10 |

* cited by examiner

*Primary Examiner* — Jonathan Y Jung
(74) *Attorney, Agent, or Firm* — MUNCY, GEISSLER, OLDS & LOWE, P.C.

(57) ABSTRACT

An optical element driving mechanism is provided. The optical element driving mechanism includes a fixed portion, a first movable portion, and a driving assembly. The first movable portion movably connects to the fixed portion and used for disposing a first optical element. The driving assembly is used for driving the first movable portion to move relative to the fixed portion. The driving assembly includes piezoelectric driving assembly.

18 Claims, 11 Drawing Sheets

OPTICAL ELEMENT DRIVING MECHANISM

BACKGROUND OF THE INVENTION

Field of the Invention

The present disclosure relates to an optical element driving mechanism.

Description of the Related Art

As technology has developed, it has become more common to include image-capturing and video-recording functions into many types of modern electronic devices, such as smartphones and digital cameras. These electronic devices are used more and more often, and new models have been developed that are convenient, thin, and lightweight, offering more choice to consumers.

Electronic devices that have image-capturing or video-recording functions normally include an optical system to drive an optical element (such as a lens) to move along its optical axis, thereby achieving auto focus (AF) or optical image stabilization (OIS). Light may pass through the optical element and may form an image on an optical sensor. However, the trend in modern mobile devices is to have a smaller size and a higher durability. As a result, how to effectively reduce the size of the optical system and how to increase its durability has become an important issue.

BRIEF SUMMARY OF THE INVENTION

An optical system is provided in some embodiments. The optical system includes a first assembly and a second assembly. The first assembly includes a first welding portion. The second assembly is affixed on the first assembly and includes a second welding portion. The first welding portion is affixed on the second welding portion by welding.

In some embodiments, the optical element driving mechanism further includes a second movable portion, a first guiding element, and a second guiding element. The second movable portion is movably connected to the fixed portion and used for disposing a second optical element. The first guiding element connects to the first movable portion, the second movable portion, and the fixed portion, and extending in a first direction. The second guiding element connects the first movable portion, the second movable portion, and the fixed portion, and extending in the first direction.

In some embodiments, the driving assembly is used for driving the second movable portion to move relative to the fixed portion. The first movable portion and the second movable portion are arranged along a main axis, and the main axis extends in the first direction.

In some embodiments, the first guiding element and the second guiding element are arranged in a second direction. The first direction and the second direction are different.

In some embodiments, when viewed from the first direction, the size of the optical element driving mechanism in the second direction is different from the size of the optical element driving mechanism in a third direction. The first direction and the third direction are different. The second direction and the third direction are different.

In some embodiments, the first direction and the second direction are perpendicular. The first direction and the third direction are perpendicular. The second direction and the third direction are perpendicular.

In some embodiments, when viewed from the first direction, the size of the optical element driving mechanism in the second direction is greater than that in the third direction.

In some embodiments, the driving assembly comprises a first weighting element, a first driving element, and a transport element. The first weighting element connects the transport element through the first driving element. The first driving element is used for driving the first movable portion to move relative to the fixed portion. The transport element extends in the first direction.

In some embodiments, when viewed from the first direction, the transport element, the first guiding element, and the second guiding element are at an identical plane. The main axis does not pass through the plane.

In some embodiments, the optical element driving mechanism further includes a first clamping element, a second clamping element, and a first temperature sensing element. The first movable portion movably connects to the driving assembly through the first clamping element. The second movable portion movably connects to the driving assembly through the second clamping element. The first temperature sensing element corresponds to the first driving element and used for detecting the temperature of the first driving element.

In some embodiments, the first clamping element and the second clamping element are arranged in the first direction. The first clamping element provides a first clamping force to the driving assembly. The second clamping element provides a second clamping force to the driving assembly. The first clamping force and the second clamping force are different.

In some embodiments, when viewed from the third direction, the length of the transport element and the length of the first guiding element are different. When viewed from the third direction, the length of the transport element and the length of the second guiding element are different.

In some embodiments, when viewed from the third direction, the length of the transport element is less than the length of the first guiding element. When viewed from the third direction, the length of the transport element is less than the length of the second guiding element.

In some embodiments, the driving assembly further comprises a second weighting element and a second driving element. The second weighting element connects to the transport element through the second driving element. The second driving element is used for driving the second movable portion to move relative to the fixed portion.

In some embodiments, the first driving element and the second driving element are at opposite ends of the transport element. The first driving element and the second driving element are driven independently.

In some embodiments, the first movable portion comprises a first resonance frequency. The second movable portion comprises a second resonance frequency. The first resonance frequency and the second resonance frequency are different.

In some embodiments, the optical element driving mechanism further includes a first magnetic element disposed on the first movable portion, a first sensing element disposed on the fixed portion and corresponds to the first magnetic element, a second magnetic element disposed on the second movable portion, and a second sensing element disposed on the fixed portion and corresponds to the second magnetic element.

In some embodiments, the first sensing element is used for detecting the position of the first movable portion relative to the fixed portion. The second sensing element is used for detecting the position of the second movable portion relative to the fixed portion. The first magnetic element and the first sensing element are arranged in the third direction. The second magnetic element and the second sensing element are arranged in the third direction.

In some embodiments, the optical element driving mechanism further includes a second temperature sensing element corresponds to the second driving element and is used for detecting the temperature of the second driving element, and a circuit assembly embedded in the bottom.

In some embodiments, driving frequencies of the first driving element and the second driving element are identical. The first driving element is electrically isolated from the second driving element.

BRIEF DESCRIPTION OF THE DRAWINGS

Aspects of the present disclosure are best understood from the following detailed description when read with the accompanying figures. It should be noted that, in accordance with the standard practice in the industry, various features are not drawn to scale. In fact, the dimensions of the various features may be arbitrarily increased or reduced for clarity of discussion.

DETAILED DESCRIPTION OF THE INVENTION

The following disclosure provides many different embodiments, or examples, for implementing different features of the provided subject matter. Specific examples of components and arrangements are described below to simplify the present disclosure. These are, of course, merely examples and are not intended to be limiting. For example, in some embodiments, the formation of a first feature over or on a second feature in the description that follows may include embodiments in which the first and second features are in direct contact, and may also include embodiments in which additional features may be disposed between the first and second features, such that the first and second features may not be in direct contact.

In addition, the present disclosure may repeat reference numerals and/or letters in the various examples. This repetition is for the purpose of simplicity and clarity and does not in itself dictate a relationship between the various embodiments and/or configurations discussed. Moreover, the formation of a feature on, connected to, and/or coupled to another feature in the present disclosure that follows may include embodiments in which the features are in direct contact, and may also include embodiments in which additional features may be disposed interposing the features, such that the features may not be in direct contact. In addition, spatially relative terms, for example, "vertical," "above," "over," "below,", "bottom," etc. as well as derivatives thereof (e.g., "downwardly," "upwardly," etc.) are used in the present disclosure for ease of description of one feature's relationship to another feature. The spatially relative terms are intended to cover different orientations of the device, including the features.

Unless defined otherwise, all technical and scientific terms used herein have the same meaning as commonly understood by one of ordinary skill in the art to which this disclosure belongs. It should be appreciated that each term, which is defined in a commonly used dictionary, should be interpreted as having a meaning conforming to the relative skills and the background or the context of the present disclosure, and should not be interpreted in an idealized or overly formal manner unless defined otherwise.

Use of ordinal terms such as "first", "second", etc., in the claims to modify a claim element does not by itself connote any priority, precedence, or order of one claim element over another or the temporal order in which acts of a method are performed, but are used merely as labels to distinguish one claim element having a certain name from another element having the same name (but for use of the ordinal term) to distinguish the claim elements.

In addition, in some embodiments of the present disclosure, terms concerning attachments, coupling and the like, such as "connected" and "interconnected", refer to a relationship wherein structures are secured or attached to one another either directly or indirectly through intervening structures, as well as both movable or rigid attachments or relationships, unless expressly described otherwise.

Figure 1A:
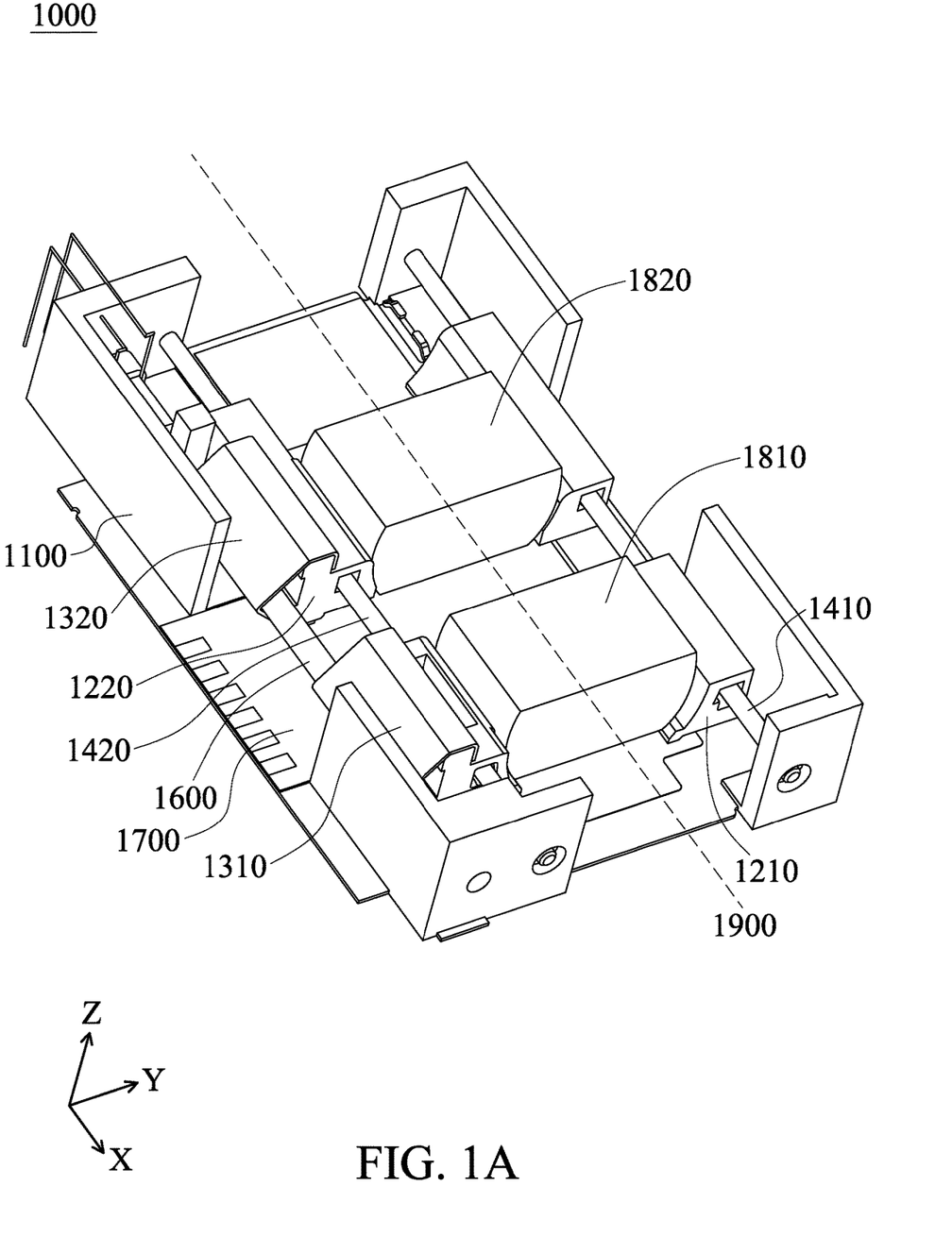
FIG. 1A is a schematic view of an optical element driving mechanism.
Figure 1B:
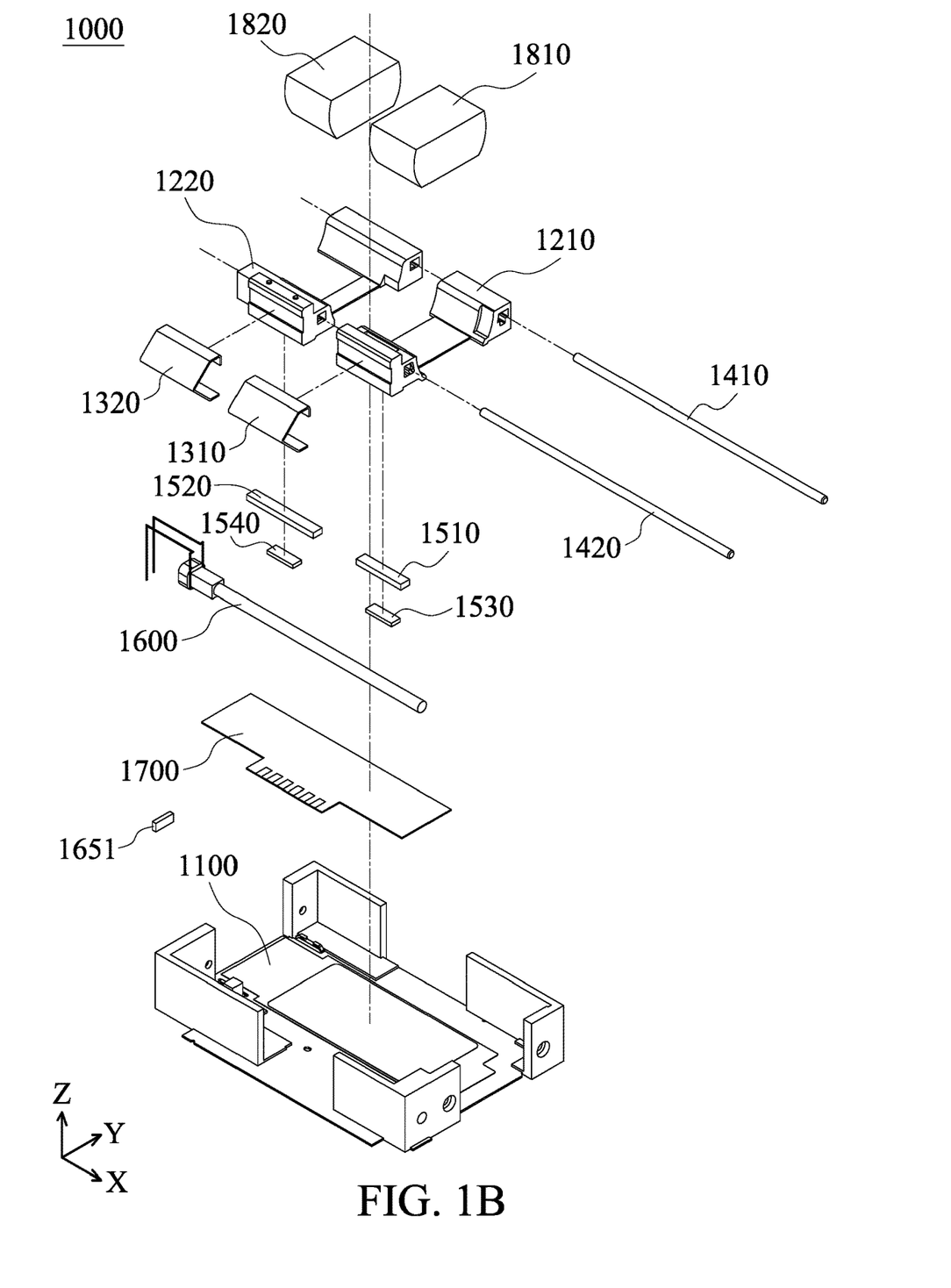
FIG. 1B is an exploded view of the optical element driving mechanism.
Figure 1C:
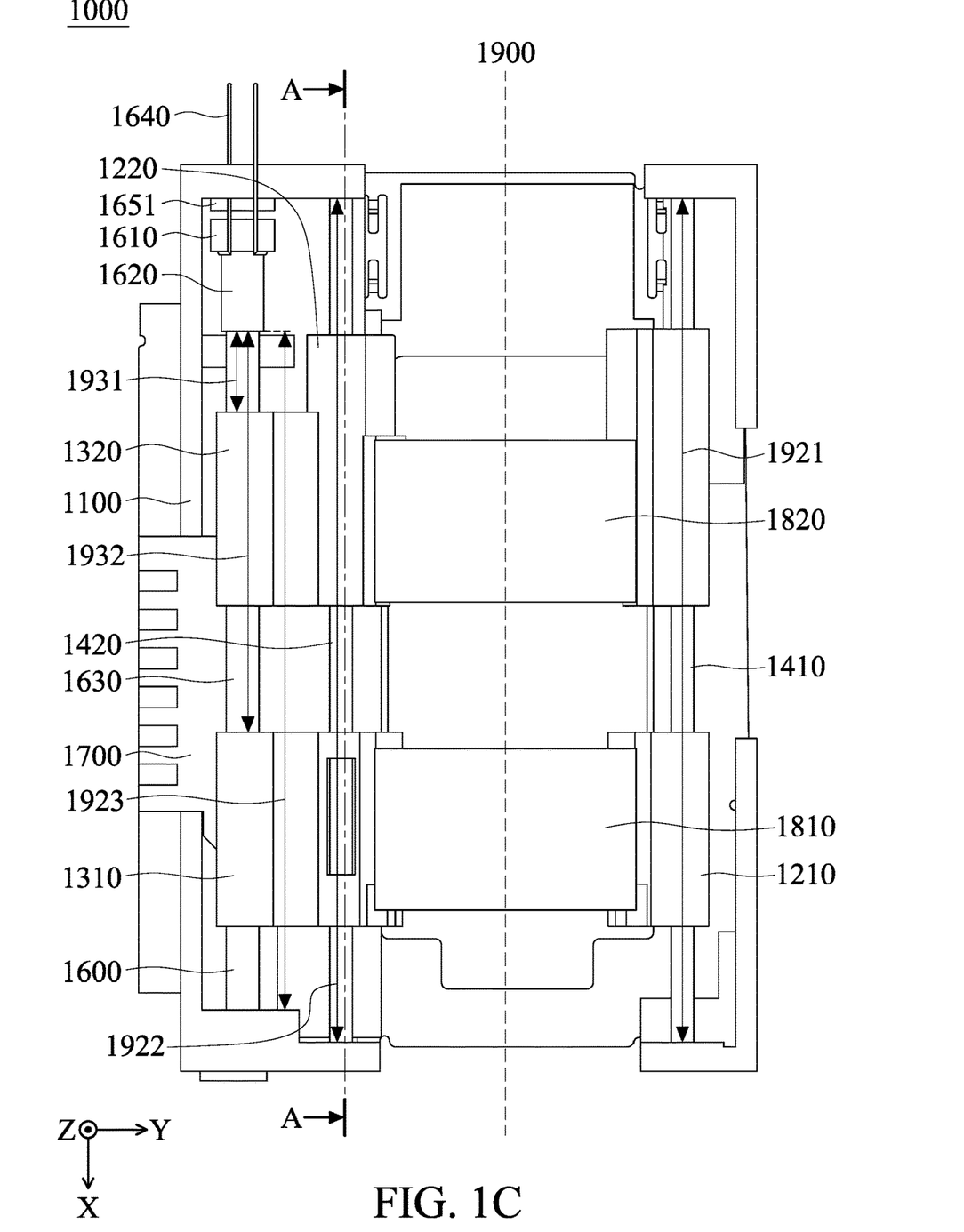
FIG. 1C is a top view of the optical element driving mechanism.
Figure 2:
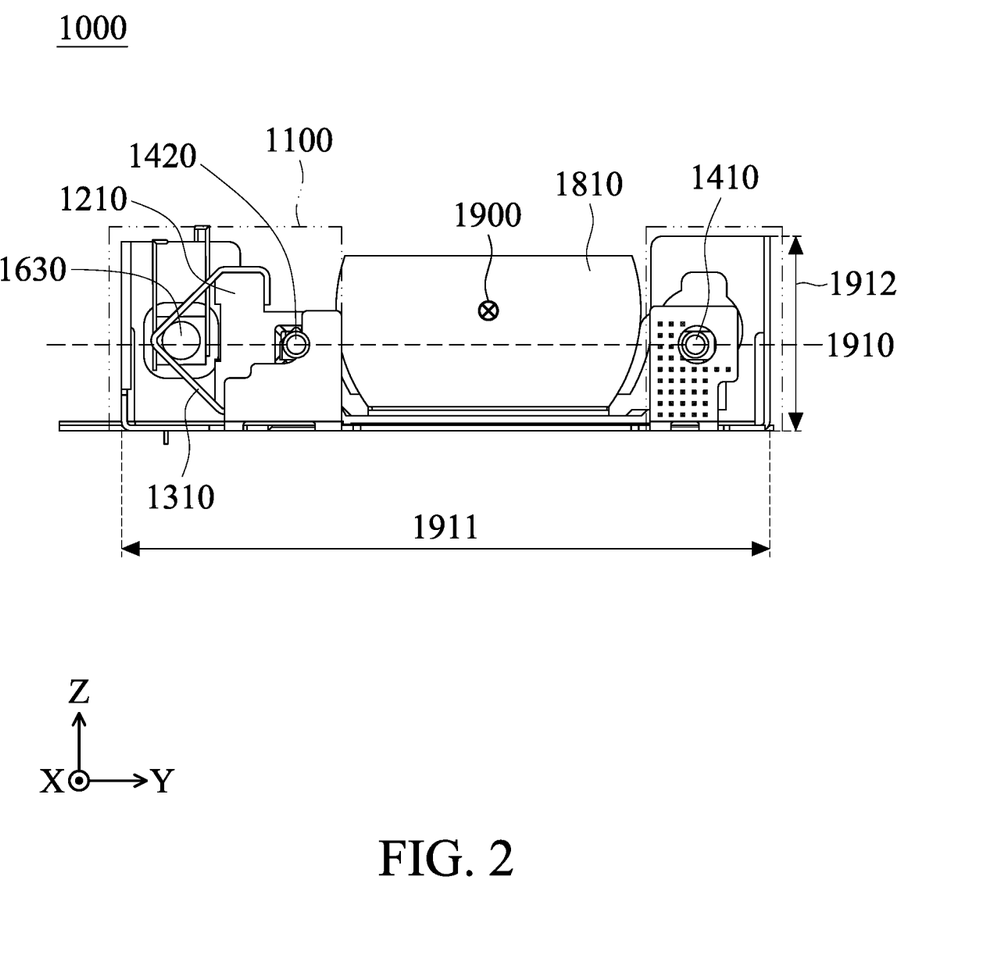
FIG. 2 is a side view of the optical element driving mechanism.
Figure 3:
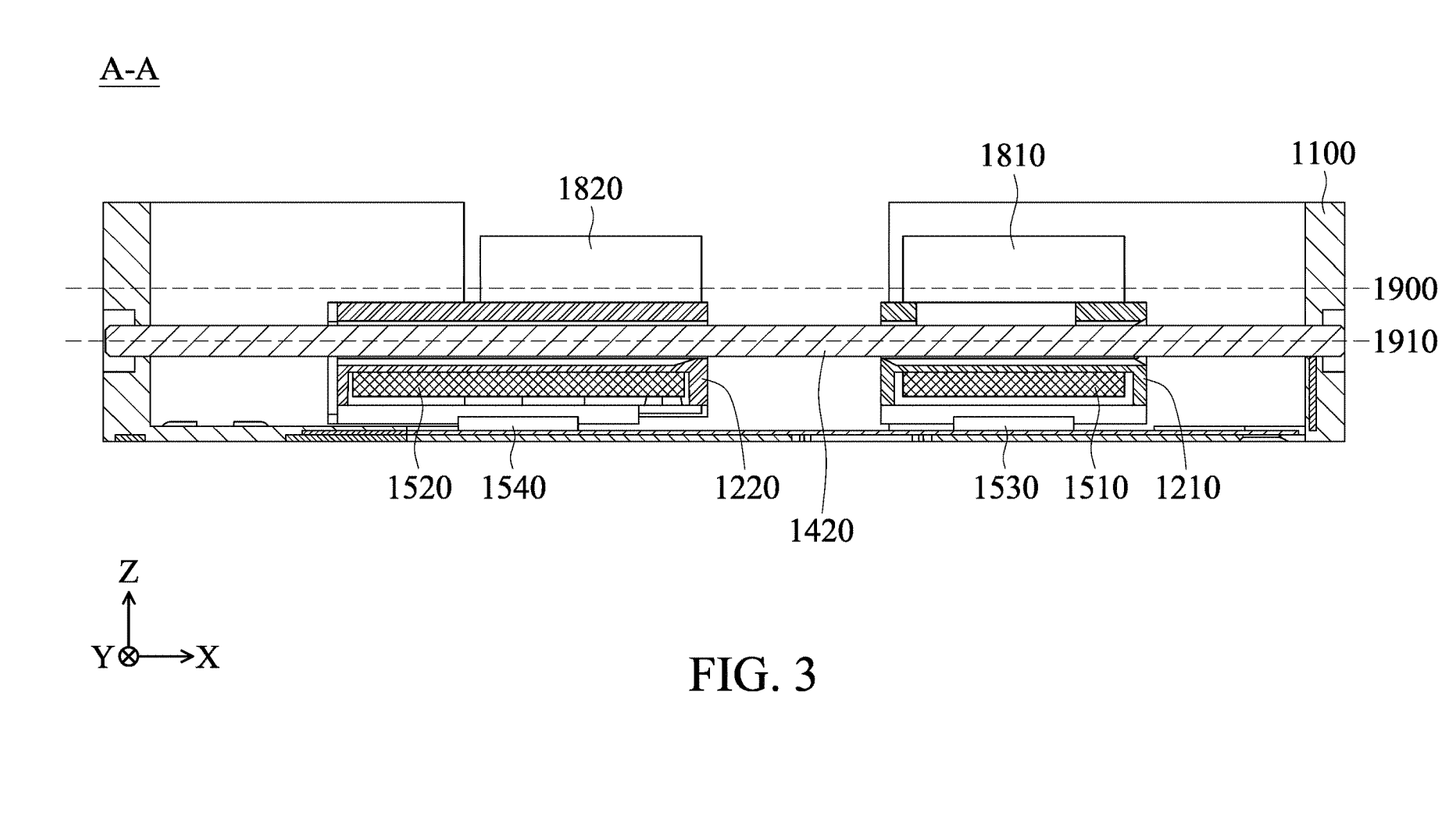
FIG. 3 is a cross-sectional view illustrated along the line A-A of FIG. 1C.

An optical element driving mechanism is provided for driving an optical element to move. For example, FIG. 1A is a schematic view of an optical element driving mechanism 1000. FIG. 1B is an exploded view of the optical element driving mechanism 1000. FIG. 1C is a top view of the optical element driving mechanism 1000. FIG. 2 is a side view of the optical element driving mechanism 1000. FIG. 3 is a cross-sectional view illustrated along the line A-A of FIG. 1C.

As shown in FIG. 1A to FIG. 3, the optical element driving mechanism 1000 may mainly include a bottom 1100, a first movable portion 1210, a second movable portion 1220, a first clamping element 1310, a second clamping element 1320, a first guiding element 1410, a second guiding element 1420, a first magnetic element 1510, a second magnetic element 1520, a first sensing element 1530, a second sensing element 1540, a driving assembly 1600, a first temperature sensing element 1651, and a circuit assembly 1700. The optical element driving mechanism 1000 may be used for driving a first optical element 1810 and a second optical element 1820 to move in a first direction (X direction).

In some embodiments, the bottom 1100 may be called as a fixed portion 1100, and the first movable portion 1210 and the second movable portion 1220 are movably connected to the bottom 1100 for disposing the first optical element 1810 and the second optical element 1820, respectively. The first clamping element 1310 and the second clamping element 1320 may be clamped on the first movable portion 1210 and the second movable portion 1220, such as affixed on the first movable portion 1210 and the second movable portion 1220, respectively. In some embodiments, the first movable portion 1210 and the second movable portion 1220 may arrange along a main axis 1900. The main axis 1900 may extend in the first direction (the X direction), such as may pass through the first movable portion 1210 and the second movable portion 1220.

In some embodiments, the first guiding element 1410 and the second guiding element 1420 may be disposed on the bottom 1100, the first movable portion 1210, and the second movable portion 1220 for movably connect the bottom 1100, the first movable portion 1210, and the second movable portion 1220. In some embodiments, the first guiding element 1410 and the second guiding element 1420 may extend in the first direction (the X direction) and may arrange in a second direction (the Y direction).

In some embodiments, the first magnetic element 1510 and the second magnetic element 1520 may be disposed on the first movable portion 1210 and the second movable portion 1220, respectively. The first sensing element 1530 and the second sensing element 1540 may correspond to the first magnetic element 1510 and the second magnetic element 1520, respectively. For example, they may arrange in the Z direction. The first magnetic element 1510 and the second magnetic element 1520 may be magnets. The first sensing element 1530 and the second sensing element 1540 may include a Hall sensor, a magnetoresistance effect sensor (MR sensor), a giant magnetoresistance effect sensor (GMR sensor), a tunneling magnetoresistance effect sensor (TMR sensor), or a fluxgate sensor. The first sensing element 1530 and the second sensing element 1540 may detect the magnetic field of the first magnetic element 1510 and the second magnetic element 1520 to get the positions of the first movable portion 1210 and the second movable portion 1220 relative to the bottom 1100.

In some embodiments, the driving assembly 1600 may be disposed on the bottom 1100, the first movable portion 1210, the second movable portion 1220, the first clamping element 1310, and the second clamping element 1320 used for driving the first movable portion 1210 and the second movable portion 1220 to move relative to the bottom 1100. Therefore, the first movable portion 1210 may movably connect the driving assembly 1600 through the first clamping element 1310, and the second movable portion 1220 may movably connect the driving assembly 1600 through the second clamping element 1320.

Figure 4:
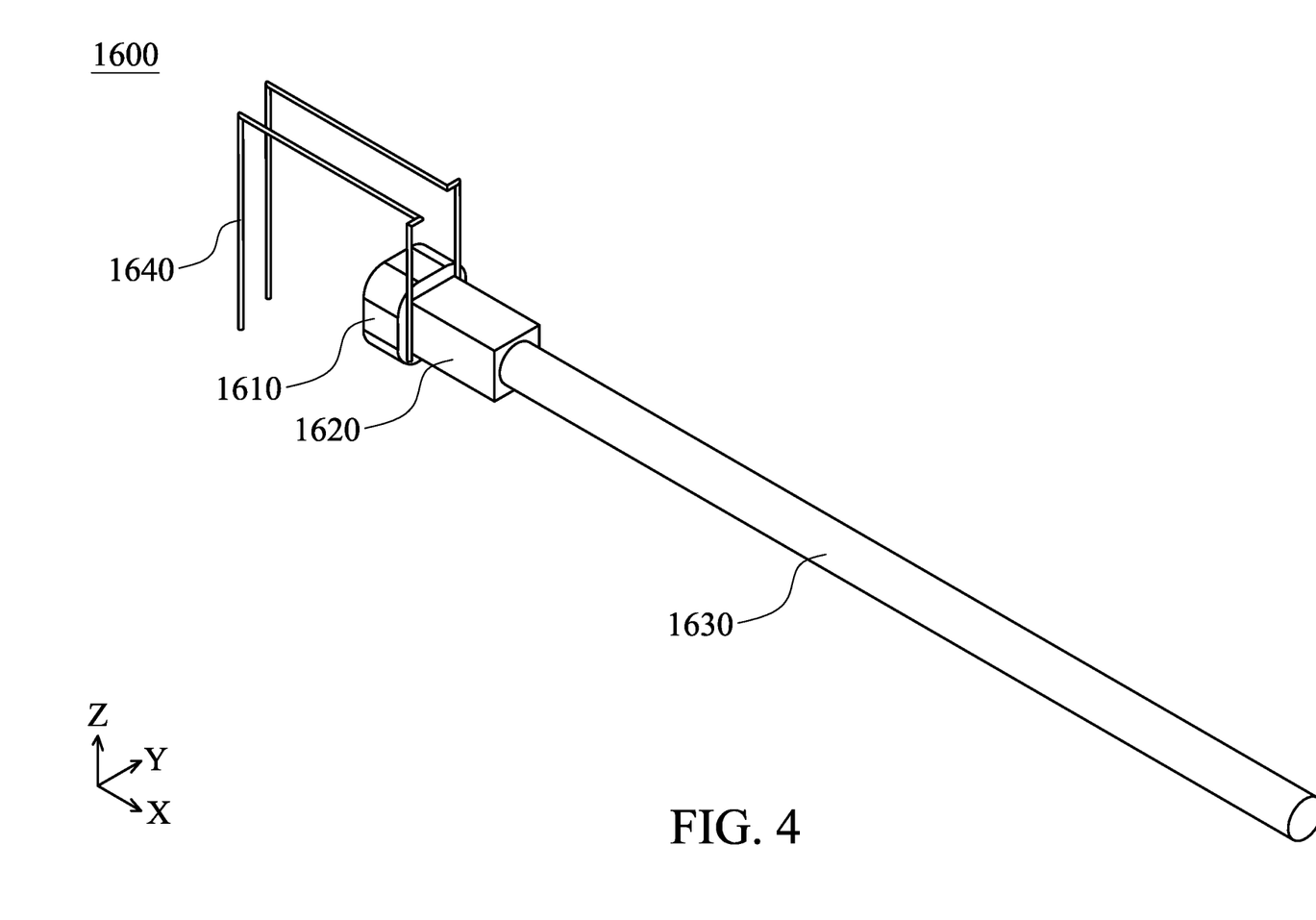
FIG. 4 is a schematic view of the driving assembly.

In some embodiments, the driving assembly 1600 may include piezoelectric driving assembly. For example, FIG. 4 is a schematic view of the driving assembly 1600, which includes a first weighting element 1610, a first driving element 1620, a transport element 1630, and a wires 1640. In some embodiments, the first weighting element 1610 may connect the transport element 1630 through the first driving element 1620. In some embodiments, the transport element 1630 may extend in the X direction.

In some embodiments, the first driving element 1620 may include piezoelectric materials. That is to say, when an electric field (voltage) is applied to the surface of the first driving element 1620, the electric dipole moment of the first driving element 1620 may be elongated, and the first driving element 1620 is resistant to changes and will extend along the electric field direction. Therefore, electrical energy may convert into mechanical energy. In some embodiments, an electric field in the X direction (second direction) may be applied to the first driving element 1620, so that the length of the first driving element 1620 in the X direction may be changed (e.g., elongated or shortened). Therefore, the transport element 1630 may be move in the first direction. In some embodiments, the density of the first weighting element 1610 may be greater than the density of the transport element 1630 to resist reaction force when the first driving element 1620 is driving. In some embodiments, the material of the transport element 1630 may include carbon fiber, and the material of the first weighting element 1610 may include metal. For example, the density of the first weighting element 1610 may be between about 5 g/cm$^3$ to about 20 g/cm$^3$.

In some embodiments, the first driving element 1620 may electrically connect to the circuit assembly 1700 or other circuit (e.g. a circuit assembly embedded in the bottom 1100, not shown) through the wires 1640. The wires 1640 may be disposed on the first driving element 1620. Therefore, electrical signal may be provided to the first driving element 1620 for controlling the first driving element 1620. The circuit assembly 1700 may be, for example, a flexible printed circuit adhered on the bottom 1100. In this embodiment, the circuit assembly 1700 is electrically connected to other electronic elements disposed inside or outside the optical element driving mechanism 1000. For example, an electric signal may be transfer to the driving assembly 1600 through the circuit assembly 1700 to control the movement of the first movable portion 1210 and the second movable portion 1220 in the X direction to achieve auto focus or zooming.

In some embodiments, the transport element 1630 may be disposed on the first movable portion 1210, the second movable portion 1220, the first clamping element 1310, and the second clamping element 1320 by friction contact. For example, the first clamping element 1310 and the second clamping element 1320 may arrange in the first direction. The first clamping element 1310 may provide a first clamping force to the first movable portion 1210 and the transport element 1630 to be a friction source between the first movable portion 1210 and the transport element 1630. For example, the maximum static friction between the first movable portion 1210 and the transport element 1630 may be equal to the first clamping force. The second clamping element 1320 may provide a second clamping force to the second movable portion 1220 and the transport element 1630 to be a friction source between the second movable portion 1220 and the transport element 1630. For example, the maximum static friction between the second movable portion 1220 and the transport element 1630 may be equal to the second clamping force.

In some embodiments, the first driving element 1620 may provide a first driving force to the first movable portion 1210, and provide a second driving force to the second movable portion 1220. Since a distance 1930 between the first movable portion 1210 and the first driving element 1620 is different from a distance 1932 between the second movable portion 1220 and the first driving element 1620, such as the first movable portion 1210 may be closer to the first driving element 1620, and the second movable portion 1220 may be farther from the first driving element 1620. In other words, the distance 1931 may be less than the distance 1932, so the first driving force and the second driving force may be different. For example, the loss of the first driving force and the loss of the second driving force transmitted by the transport element 1630 may be different. Moreover, in some embodiments, the first clamping force and the second clamping force may be different.

In some embodiments, the first driving force may be greater than the second driving force, so the first movable portion 1210 and the second movable portion 1220 may be controlled independently. For example, in a first mode, high first driving force and second driving force may be provided, such may be greater than the first clamping force and the second clamping force, respectively (i.e. greater than the maximum static friction between the first movable portion 1210 and the transport element 1630, and between the second movable portion 1220 and the transport element 1630). Therefore, when the transport element 1630 is moving, the first movable portion 1210 and the second movable portion 1220 may move with the transport element 1630.

In some embodiments, in a second mode, the first clamping force and the second clamping force may be adjusted, such as the second clamping force may be greater than the first clamping force. Alternatively, the first driving force and the second driving force may be adjusted, such as the first driving force may be less than or equal to the maximum static friction between the first movable portion 1210 and the transport element 1630, and the second driving force provided by the first driving element 1620 through the transport element 1630 to the second movable portion 1220 may be greater than the maximum static friction between the second movable portion 1220 and the transport element 1630. Therefore, when the second movable portion 1220 is driven by the transport element 1630, the first movable portion 1210 may be static, so the first movable portion 1210 and the second movable portion 1220 may be driven independently.

In some embodiments, in a third mode, the first driving force may be greater than the maximum static friction (first clamping force) between the first movable portion 1210 and the transport element 1630, and the second driving force may be less than he maximum static friction (second clamping force) between the second movable portion 1220 and the transport element 1630. In such situation, the first movable portion 1210 may move with the transport element 1630, and the second movable portion 1220 may remain static, so the first movable portion 1210 and the second movable portion 1220 may be driven independently.

In some embodiments, the first temperature sensing element 1651 may correspond to the first driving element 1620, such as may arrange with the first driving element 1620 in the first direction (or other directions such as the second direction or the third direction) to detect the temperature of the first driving element 1620, so the way to drive the first driving element 1620 may be changed based on temperature variation.

In some embodiments, the first optical element 1810 and the second optical element 1820 may be, for example, a lens, a mirror, a prism, a beam splitter, an aperture, a liquid lens, an image sensor, a camera module, or a ranging module. It should be noted that the definition of the optical element is not limited to the element that is related to visible light, and other elements that relate to invisible light (e.g. infrared or ultraviolet) are also included in the present disclosure.

In some embodiments, when viewed from the first direction, the size 1911 of the optical element driving mechanism 1000 in the second direction is different from the size 1912 of the optical element driving mechanism 1000 in the third direction (e.g. the Z direction). For example, the size 1911 may be greater than the size 1912, so the size of the optical element driving mechanism 1000 in the Z direction may be reduced.

In some embodiments, when viewed from the first direction, the transport element 1630, the first guiding element 1410, and the second guiding element 1420 locate in an identical plane 1910. In some embodiments, the main axis 1900 does not pass through the plane 1910. Therefore, the first movable portion 1210 and the second movable portion 1220 may move in a direction identical to the direction of the driving force provided by the driving assembly 1600 to enhance the driving performance. In some embodiments, when viewed from the third direction, the length 1921 of the first guiding element 1410 and the length 1922 of the second guiding element 1420 may be different from the length 1923 of the transport element 1630. For example, the length 1923 may be less than the length 1921 and the length 1922, and the length 1921 may be equal to the length 1922. Therefore, the transport element 1630 with less length 1923 may be used for driving the first movable portion 1210 and the second movable portion 1220 to reduce the weight of the optical element driving mechanism 1000.

Figure 5A:
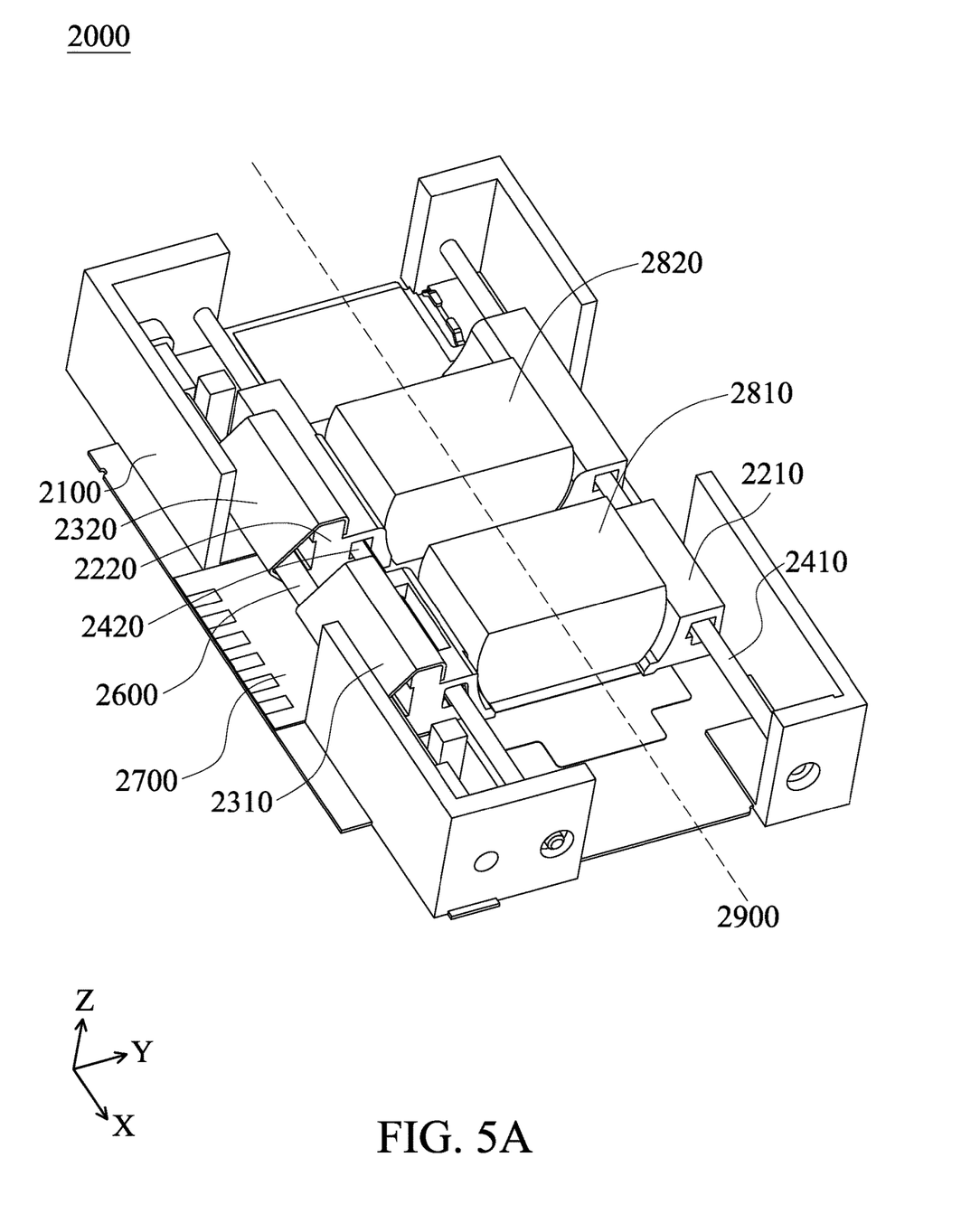
FIG. 5A is a schematic view of an optical element driving mechanism.
Figure 5B:
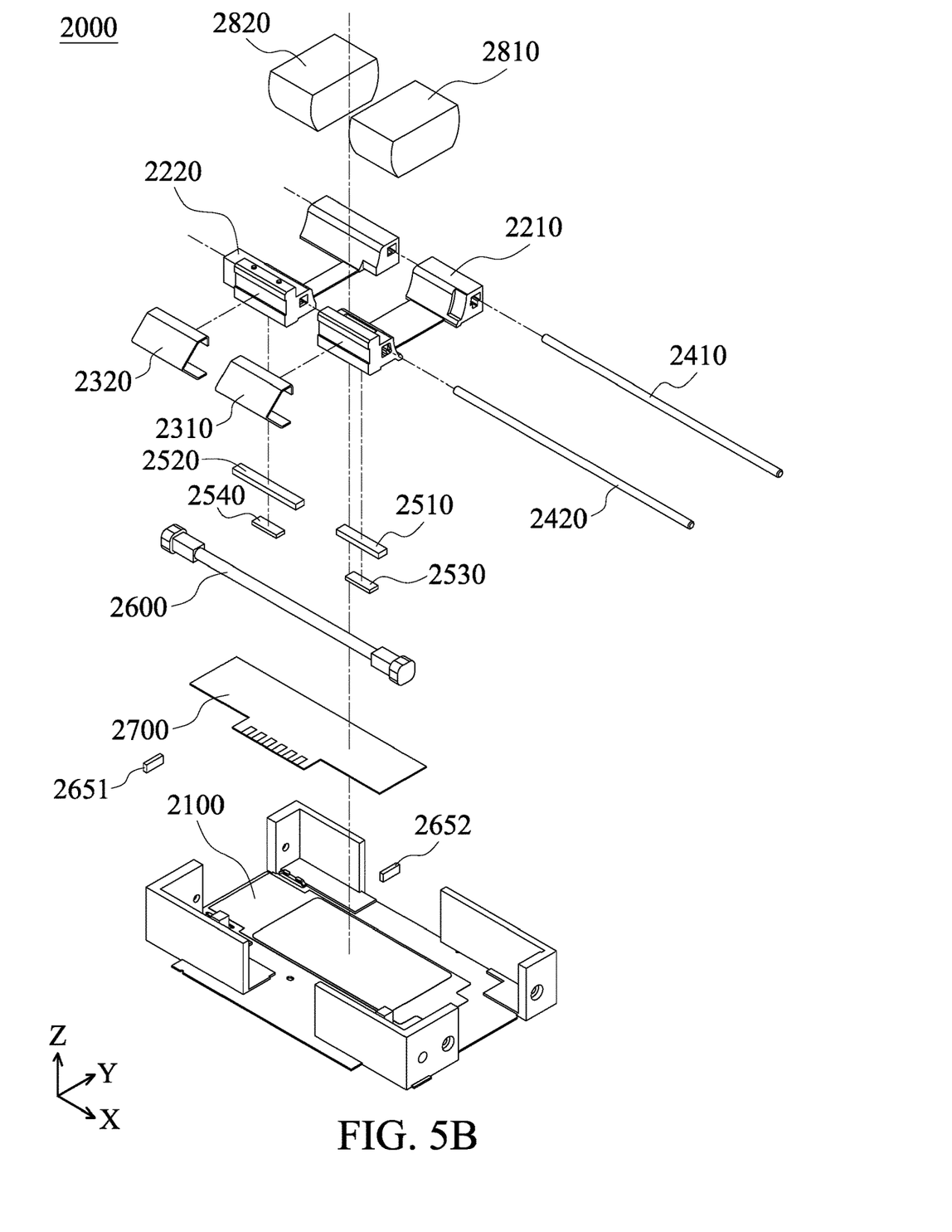
FIG. 5B is an exploded view of the optical element driving mechanism.
Figure 5C:
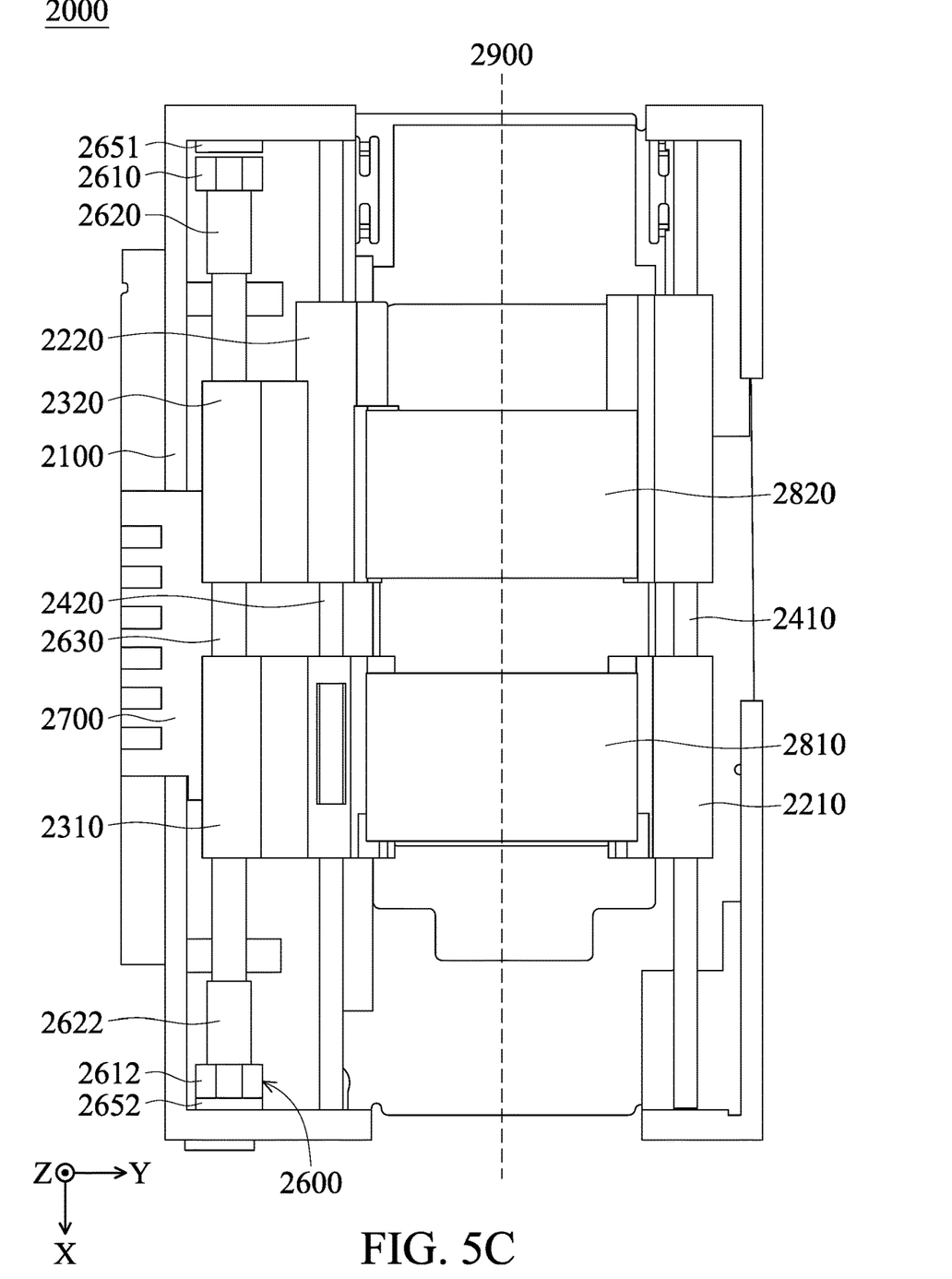
FIG. 5C is a top view of the optical element driving mechanism.
Figure 6:
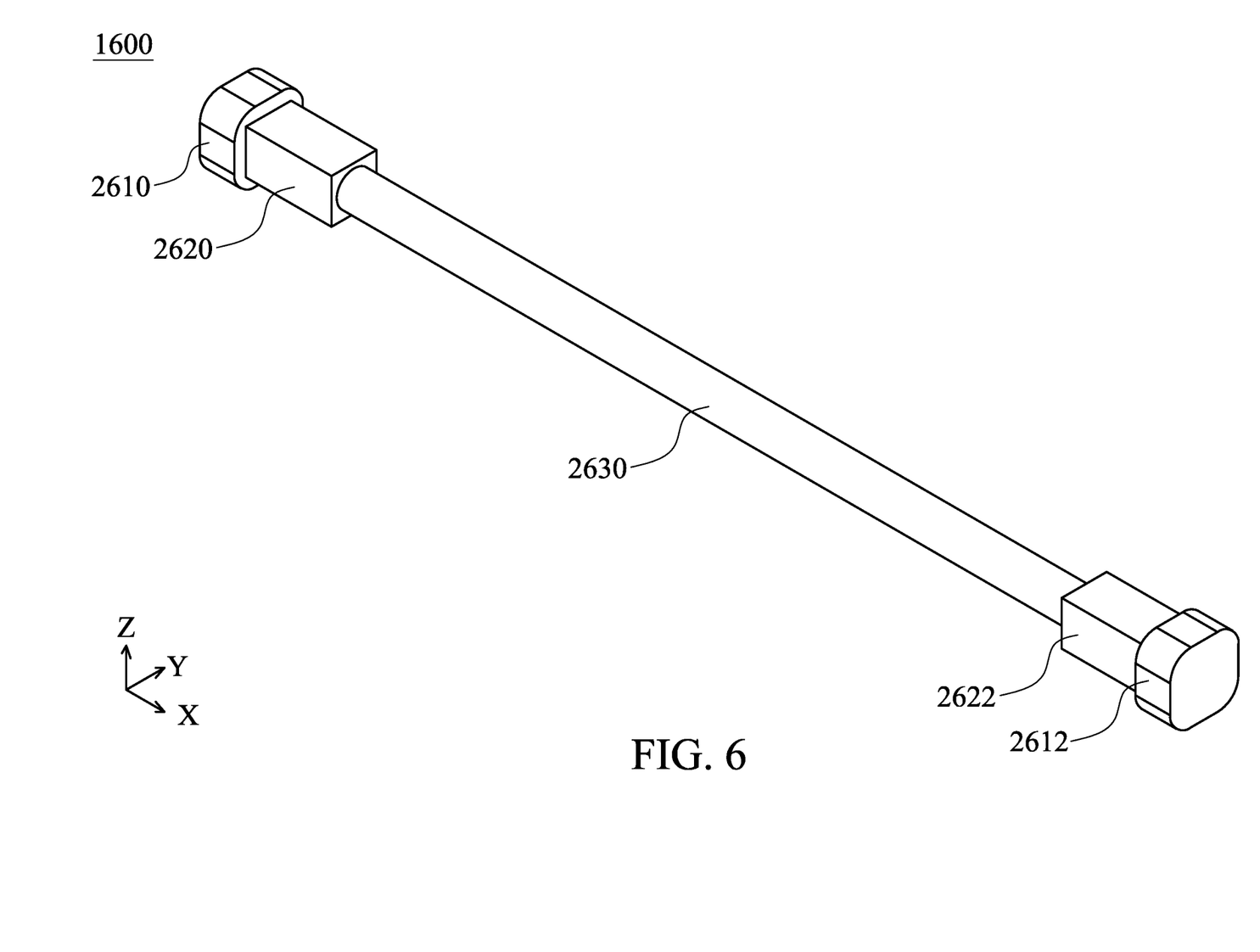
FIG. 6 is a schematic view of a driving assembly of the optical element driving mechanism.

In some embodiments, additional driving element may be provided to the driving assembly to enhance the driving force. For example, FIG. 5A is a schematic view of an optical element driving mechanism 2000. FIG. 5B is an exploded view of the optical element driving mechanism 2000. FIG. 5C is a top view of the optical element driving mechanism 2000. FIG. 6 is a schematic view of a driving assembly 2600 of the optical element driving mechanism 2000.

As shown in FIG. 5A to FIG. 5C, the optical element driving mechanism 2000 may mainly include a bottom 2100, a first movable portion 2210, a second movable portion 2220, a first clamping element 2310, a second clamping element 2320, a first guiding element 2410, a second guiding element 2420, a first magnetic element 2510, a second magnetic element 2520, a first sensing element 2530, a second sensing element 2540, a driving assembly 2600, a first temperature sensing element 2651, a second temperature sensing element 2652, and a circuit assembly 2700. The optical element driving mechanism 2000 may be used for driving a first optical element 2810 and a second optical element 2820 to move in a first direction (X direction).

In some embodiments, the functions and positions of the bottom 2100, the first movable portion 2210, the second movable portion 2220, the first clamping element 2310, the second clamping element 2320, the first guiding element 2410, the second guiding element 2420, the first magnetic element 2510, the second magnetic element 2520, the first sensing element 2530, the second sensing element 2540, the driving assembly 2600, the first temperature sensing element 2651, the circuit assembly 2700, the first optical element 2810, and the second optical element 2820 may be equal to or similar to the bottom 1100, the first movable portion 1210, the second movable portion 1220, the first clamping element 1310, the second clamping element 1320, the first guiding element 1410, the second guiding element 1420, the first magnetic element 1510, the second magnetic element 1520, the first sensing element 1530, the second sensing element 1540, the driving assembly 1600, the first temperature sensing element 1651, the circuit assembly 1700, the first optical element 1810, and the second optical element 1820 of the optical element driving mechanism 1000, and they are not repeated.

In some embodiments, the driving assembly 2600 may include a first weighting element 2610, a second weighting element 2612, a first driving element 2620, a second driving element 2622, and the transport element 2630. The material and the structure of the first weighting element 2610 and the second weighting element 2612 may be similar or identical, and the material and the structure of the first driving element 2620 and the second driving element 2622 may be similar or identical. The first weighting element 2610 and the second weighting element 2612 may be disposed on opposite ends of the transport element 2630, and the first driving element 2620 and the second driving element 2622 may be disposed on opposite ends of the transport element 2630. The second weighting element 2612 may connect to the transport element 2630 through the second driving element 2622. The first driving element 2620 may be used for driving the first movable portion 2210 to move relative to the fixed portion (e.g. the bottom 2100), and the second driving element 2622 may be used for driving the second movable portion 2220 to move relative to the fixed portion (e.g. the bottom 2100).

In some embodiments, the first temperature sensing element 2651 and the second temperature sensing element 2652 may respectively correspond to the first driving element 2620, such as may respectively arrange with the first driving element 2620 and the second driving element 2622 in the first direction (or other directions such as the second direction or the third direction) to detect the temperature of the first driving element 2620 and the second driving element 2622, so the way to drive the first driving element 2620 may be changed based on temperature variation.

In some embodiments, the first driving element 2620 and the second driving element 2622 may be driven independently, such as may be electrically isolated with each other. The first driving element 2620 and the second driving element 2622 may receive different first driving information and second driving information (e.g. the driving information 3100, the driving information 3200, or the driving information 3300) to control the first movable portion 2210 and the second movable portion 2220 independently. For example, the first movable portion 2210 has a first resonance frequency, the second movable portion 2220 has a second resonance frequency, and the first resonance frequency and the second resonance frequency are different. In some embodiments, the first driving element 2620 and the second driving element 2622 may vibrate with the first resonance frequency and the second resonance frequency, respectively, so the first movable portion 2210 and the second movable portion 2220 may be controlled independently. However, the present disclosure is not limited thereto. For example, in some embodiments, even if the first resonance frequency and the second resonance frequency are different, the driving frequencies of the first driving element 2620 and the second driving element 2622 may be identical. Since the first driving element 2620 is closer to the first movable portion 2210, the second driving element 2622 is closer to the second movable portion 2220, different driving forces may be achieves. Therefore, the first movable portion 2210 and the second movable portion 2220 may be controlled independently based on different driving forces. In some embodiments, the amplitude of the first driving information is different from the amplitude of the second driving information to achieve different driving forces, so the first movable portion 2210 and the second movable portion 2220 may be controlled independently based on different driving forces.

Figure 7A:
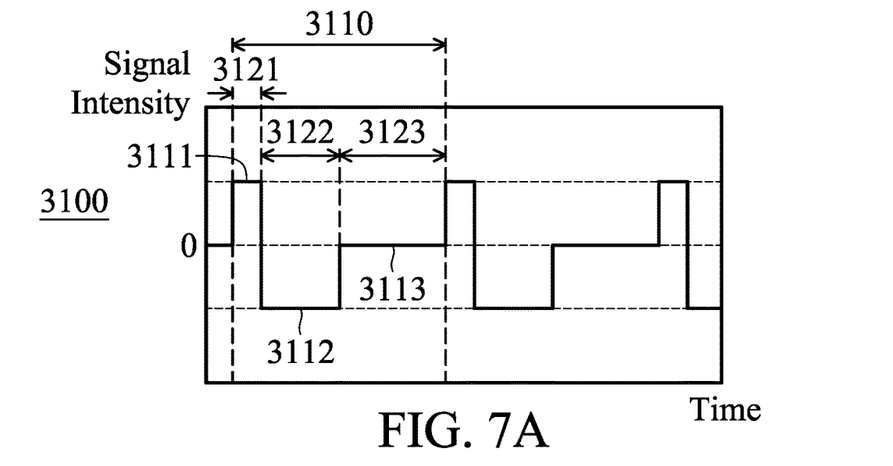
FIG. 7A is a schematic view of the driving information.

FIG. 7A is a schematic view of driving information 3100 used for controlling the first driving element 1620, the first driving element 2620, or the second driving element 2622. It should be noted that the first driving element 1620 is used as an example to describe the detail of the driving information 3100, and the similar method may be applied to the first driving element 2620 or the second driving element 2622, and it is not repeated for clarity.

As shown in FIG. 7A, the driving information 3100 may be current or voltage, and the direction of the driving information 3100 may be changed with respect to time to drive the piezoelectric first driving element 1620 to be elongated or shorten in a specific direction, and the first driving force generated by the first weighting element 1610 may be transmitted by the transport element 1630 to the first movable portion 1210, and the second driving force may be transferred to the second movable portion 1220 to drive the first movable portion 1210 and the second movable portion 1220 moving in the first direction. In some embodiments, the driving information 3100 may include multiple repeated signal periods to increase total strokes by accumulating multiple strokes to move the first movable portion 1210 and the second movable portion 1220 to specific positions.

In some embodiments, the driving information 3100 may include a combination of a positive driving signal 3111, a negative driving signal 3112, a middle driving signal 3113 in a single signal period. The positive driving signal 3111, the negative driving signal 3112, and the middle driving signal 3113 may have a positive duration 3121, a negative duration 3122, and a middle duration 3123, respectively. The positive duration 3121, the negative duration 3122, and the middle duration 3123 may be sum up as a total duration 3110. In some embodiments, the positive driving signal 3111 and the negative driving signal 3112 may have different positive or negative values, and the middle driving signal 3113 may close to zero. Therefore, the absolute value of the middle driving signal 3113 may be less than the absolute values of the positive driving signal 3111 and the negative driving signal 3112.

Specifically, when the positive driving signal 3111 is provided to the first driving element 1620, positive energy may be provided to the first driving element 1620 to use positive charges to charge the capacitive first driving element 1620, so the size of the first driving element 1620 may be changed. Afterwards, when the negative driving signal 3112 is provided to the first driving element 1620, negative energy may be provided to the first driving element 1620 to use negative charges to charge the capacitive first driving element 1620, so the size of the first driving element 1620 may be changed. The size change directions of the first driving element 1620 may be different when the positive driving signal 3111 and the negative driving signal 3112 is provided. When the middle driving signal 3113 is provided to the first driving element 1620, energy is stopped from providing to the first driving element 1620.

Figure 7B:
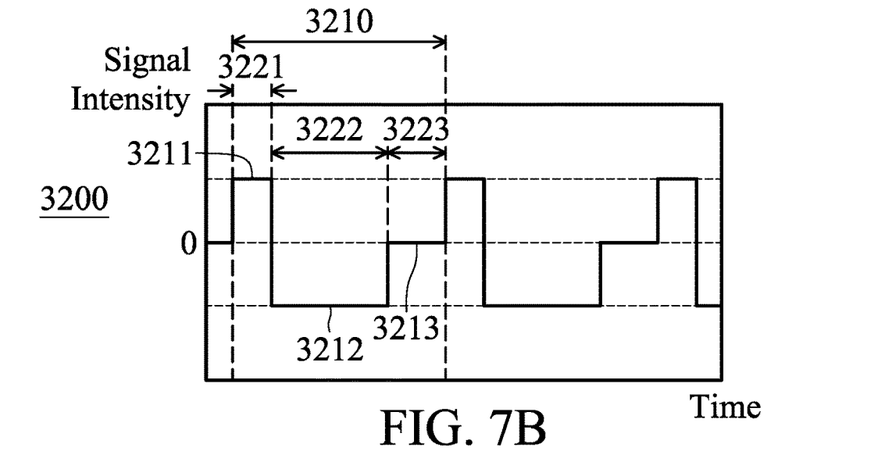
FIG. 7B is a schematic view of the driving information.

When the temperature of the first driving element 1620 is changed, such as when the temperature is increased to about 125 degree C., the capacitance of the first driving element 1620 may be increased. Therefore, if the first driving element 1620 is controlled by the driving information in the room temperature, the provided charge may be not enough to charge the capacitive first driving element 1620, so the driving force may be reduced. Therefore, the temperature of the first driving element 1620 may be detected by the first temperature sensing element 1651, and the driving information 3100 may be adjusted based on temperature difference. For example, FIG. 7B is a schematic view of the driving information 3200, wherein the driving information 3200 may be different from the driving information 3100. As shown in FIG. 7B, the driving information 3200 may be current or voltage, and the direction may be changed with respective to time to elongate or shorten the capacitive first driving element 1620 in specific directions. In some embodiments, the driving information 3200 may include multiple repeated signal periods to increase total strokes by accumulating multiple strokes to move the first movable portion 1210 and the second movable portion 1220 to specific positions.

In some embodiments, the driving information 3200 may include a combination of a positive driving signal 3211, a negative driving signal 3212, a middle driving signal 3213 in a single signal period. The positive driving signal 3211, the negative driving signal 3212, and the middle driving signal 3213 may have a positive duration 3221, a negative duration 3222, and a middle duration 3223, respectively. The positive duration 3221, the negative duration 3222, and the middle duration 3223 may be sum up as a total duration 3210. In some embodiments, the positive driving signal 3211 and the negative driving signal 3212 may have different positive or negative values, and the middle driving signal 3213 may close to zero. Therefore, the absolute value of the middle driving signal 3213 may be less than the absolute values of the positive driving signal 3211 and the negative driving signal 3212.

The total duration 3110 of the driving information 3100 may be substantially identical to the total duration 3210 of the driving information 3200, but the positive duration 3221 or the negative duration 3222 of the driving information 3200 may be longer, and the middle duration 3223 may be shorter. For example, a ratio of the positive duration 3121 and the total duration 3110 may be about 0.1, which means the positive duration 3121 may be about 10% of the total duration 3110, and a ratio of the positive duration 3221 and the total duration 3210 may be about 0.15, which means the positive duration 3221 may be about 15% of the total duration 3210. A ratio of the negative duration 3122 and the total duration 3110 may be about 0.3, which means the negative duration 3122 may be about 30% of the total duration 3110, and a ratio of the negative duration 3222 and the total duration 3210 may be about 0.5, which means the negative duration 3222 may be about 50% of the total duration 3210. By increasing the positive duration 3221 and the negative duration 3222, the charging time of the first driving element 1620 may be increased, which means more charges may be provided to the first driving element 1620, so the first driving element 1620 may generate its entire driving force.

In some embodiments, the driving information 3100 may be provided to the first driving element 1620 in a first temperature (e.g. the room temperature, about 25 degree C.). When the temperature is increased to the second temperature (e.g. about 125 degree C.), the driving information 3200 is provided to the first driving element 1620, and the first temperature is less than the second temperature to prevent the driving force of the first driving element 1620 from decreasing in high temperature. For example, in some embodiments, when the temperature of the first driving element 1620 is the first temperature, the positive time may be the positive duration 3121, the negative time may be the negative duration 3122, and the middle time may be the middle duration 3123. When the temperature of the first driving element 1620 is the second temperature, the positive time may be the positive duration 3221, the negative time may be the negative duration 3222, and the middle time may be the middle duration 3223. The positive duration 3121 may be less than the positive duration 3221, the negative duration 3122 may be less than or equal to the negative duration 3222, and the middle duration 3123 may be greater than the middle duration 3223. In the first temperature, the first driving element 1620 may have a first capacitance (e.g. about 110 nF). In the second temperature, the first driving element 1620 may have a second capacitance (e.g. about 165 nF), and the first capacitance may be less than the second capacitance. Therefore, the first driving element 1620 may receive enough charges to perform driving.

In some embodiments, the amplitudes of the driving information 3100 and the driving information 3200 may be adjusted to make the driving information 3100 and the driving information 3200 have different amplitudes. For example, the amplitude of the driving information 3100 may be less than that of the driving information 3200 to let the first driving element 1620 have a greater second driving force when the driving information 3200 is provided to the first driving element 1620.

Figure 7C:
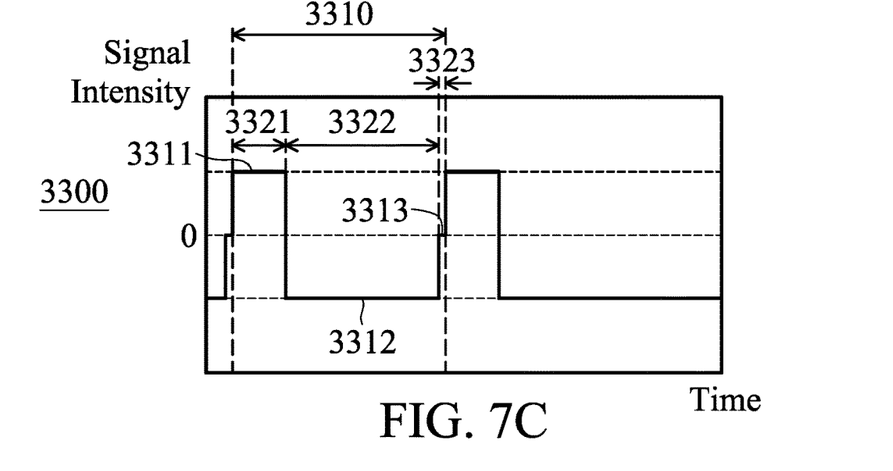
FIG. 7C is a schematic view of the driving information.

In some embodiments, the driving information may be change in a much higher temperature to get enough energy for driving the first driving element 1620. For example, FIG. 7C is a schematic view of the driving information 3300, wherein the driving information 3300 is different from the driving information 3100 and the driving information 3200. As shown in FIG. 7C, the driving information 3300 may be current or voltage, and the direction may be changed with respective to time to elongate or shorten the capacitive first driving element 1620 in specific directions. In some embodiments, the driving information 3300 may include multiple repeated signal periods to increase total strokes by accumulating multiple strokes to move the first movable portion 1210 and the second movable portion 1220 to specific positions.

In some embodiments, the driving information 3300 may include a combination of a positive driving signal 3311, a negative driving signal 3312, a middle driving signal 3313 in a single signal period. The positive driving signal 3311, the negative driving signal 3312, and the middle driving signal 3313 may have a positive duration 3321, a negative duration 3322, and a middle duration 3323, respectively. The positive duration 3321, the negative duration 3322, and the middle duration 3323 may be sum up as a total duration 3310. In some embodiments, the positive driving signal 3311 and the negative driving signal 3312 may have different positive or negative values, and the middle driving signal 3313 may close to zero. Therefore, the absolute value of the middle driving signal 3313 may be less than the absolute values of the positive driving signal 3311 and the negative driving signal 3312.

The total duration 3110 of the driving information 3100 may be substantially identical to the total duration 3210 of the driving information 3200 and the total duration 3310 of the driving information 3300, and the frequencies of the driving information 3100, the driving information 3200, and the driving information 3300 may be substantially identical, but the positive duration 3321 or the negative duration 3322 of the driving information 3300 may be longer, and the middle duration 3223 may be shorter. For example, a ratio of the positive duration 3121 and the total duration 3110 may be about 0.1, which means the positive duration 3121 may be about 10% of the total duration 3110, and a ratio of the positive duration 3321 and the total duration 3310 may be about 0.2, which means the positive duration 3321 may be about 20% of the total duration 3310. A ratio of the negative duration 3122 and the total duration 3110 may be about 0.3, which means the negative duration 3122 may be about 30% of the total duration 3110, and a ratio of the negative duration 3322 and the total duration 3310 may be about 0.65, which means the negative duration 3322 may be about 65% of the total duration 3310. By increasing the positive duration 3321 and the negative duration 3322, the charging time of the first driving element 1620 may be increased, which means more charges may be provided to the first driving element 1620, so the first driving element 1620 may generate its entire driving force. For example, the driving information 3300 may be provided to the first driving element 1620 when the first driving element 1620 has a third temperature (e.g. about 150 degree C.), and the third temperature may be higher than the first temperature and the second temperature.

In summary, an optical element driving mechanism is provided in some embodiments of the present disclosure. The optical element driving mechanism includes a fixed portion, a first movable portion, and a driving assembly. The first movable portion movably connects to the fixed portion and used for disposing a first optical element. The driving assembly is used for driving the first movable portion to move relative to the fixed portion. The driving assembly includes piezoelectric driving assembly.

A driving method is provided in some embodiments of the present disclosure. The driving method includes providing first driving information to a first driving element to drive a first movable portion relative a fixed portion to move in a first direction. The first driving information has a total duration, and includes positive driving signal, negative driving signal, and middle driving signal. The positive driving signal has a positive duration, the negative driving signal has a negative duration, and the middle driving signal has a middle duration. The positive duration, the negative duration, and the middle duration add up as the total duration. A ratio of the positive duration to the total duration is between 0.1 and 0.15. Therefore, multiple movable portions may be driven by a piezoelectric driving assembly, and the piezoelectric driving assembly may be prevent from being invalid in high temperature.

The relative positions and size relationship of the elements in the present disclosure may allow the driving mechanism achieving miniaturization in specific directions or for the entire mechanism. Moreover, different optical modules may be combined with the driving mechanism to further enhance optical quality, such as the quality of photographing or accuracy of depth detection. Therefore, the optical element driving mechanism may be further utilized to achieve multiple anti-vibration systems, so image stabilization may be significantly improved.

Although embodiments of the present disclosure and their advantages already have been described in detail, it should be understood that various changes, substitutions and alterations may be made herein without departing from the spirit and the scope of the disclosure as defined by the appended claims. Moreover, the scope of the present application is not intended to be limited to the particular embodiments of the process, machine, manufacture, and composition of matter, means, methods and steps described in the specification. As one of ordinary skill in the art will readily appreciate from the disclosure of the present disclosure, processes, machines, manufacture, compositions of matter, means, methods, or steps, presently existing or later to be developed, that perform substantially the same function or achieve substantially the same result as the corresponding embodiments described herein may be utilized according to the present disclosure. Accordingly, the appended claims are also intended to include within their scope of such processes, machines, manufacture, and compositions of matter, means, methods, or steps. In addition, each claim herein constitutes a separate embodiment, and the combination of various claims and embodiments are also within the scope of the disclosure.

What is claimed is:

1. An optical element driving mechanism, comprising:
a fixed portion;
a first movable portion movably connecting to the fixed portion and used for disposing a first optical element; and
a driving assembly used for driving the first movable portion to move relative to the fixed portion, wherein the driving assembly comprises piezoelectric driving assembly;
a second movable portion movably connected to the fixed portion and used for disposing a second optical element;
a first guiding element connecting to the first movable portion, the second movable portion, and the fixed portion, and extending in a first direction; and
a second guiding element connecting the first movable portion, the second movable portion, and the fixed portion, and extending in the first direction;
wherein:
the driving assembly is used for driving the second movable portion to move relative to the fixed portion; and
the first movable portion and the second movable portion are arranged along a main axis, and the main axis extends in the first direction.

2. The optical element driving mechanism as claimed in claim 1, wherein:
the first guiding element and the second guiding element are arranged in a second direction; and
the first direction and the second direction are different.

3. The optical element driving mechanism as claimed in claim 2, wherein:
when viewed from the first direction, the size of the optical element driving mechanism in the second direction is different from the size of the optical element driving mechanism in a third direction;
the first direction and the third direction are different; and
the second direction and the third direction are different.

4. The optical element driving mechanism as claimed in claim 3, wherein:
the first direction and the second direction are perpendicular;
the first direction and the third direction are perpendicular; and
the second direction and the third direction are perpendicular.

5. The optical element driving mechanism as claimed in claim 4, wherein:
when viewed from the first direction, the size of the optical element driving mechanism in the second direction is greater than that in the third direction.

6. The optical element driving mechanism as claimed in claim 5, wherein:
the driving assembly comprises a first weighting element, a first driving element, and a transport element;
the first weighting element connects the transport element through the first driving element;
the first driving element is used for driving the first movable portion to move relative to the fixed portion; and
the transport element extends in the first direction.

7. The optical element driving mechanism as claimed in claim 6, wherein:
when viewed from the first direction, the transport element, the first guiding element, and the second guiding element are at an identical plane; and
the main axis does not pass through the plane.

8. The optical element driving mechanism as claimed in claim 7, further comprising:

a first clamping element, wherein the first movable portion movably connects to the driving assembly through the first clamping element;

a second clamping element, wherein the second movable portion movably connects to the driving assembly through the second clamping element; and a first temperature sensing element corresponding to the first driving element and used for detecting the temperature of the first driving element.

9. The optical element driving mechanism as claimed in claim 8, wherein:

the first clamping element and the second clamping element are arranged in the first direction;

the first clamping element provides a first clamping force to the driving assembly;

the second clamping element provides a second clamping force to the driving assembly; and the first clamping force and the second clamping force are different.

10. The optical element driving mechanism as claimed in claim 9, wherein:

when viewed from the third direction, the length of the transport element and the length of the first guiding element are different; and when viewed from the third direction, the length of the transport element and the length of the second guiding element are different.

11. The optical element driving mechanism as claimed in claim 10, wherein:

when viewed from the third direction, the length of the transport element is less than the length of the first guiding element; and when viewed from the third direction, the length of the transport element is less than the length of the second guiding element.

12. The optical element driving mechanism as claimed in claim 11, wherein:

the driving assembly further comprises a second weighting element and a second driving element;

the second weighting element connects to the transport element through the second driving element; and the second driving element is used for driving the second movable portion to move relative to the fixed portion.

13. The optical element driving mechanism as claimed in claim 12, wherein:

the first driving element and the second driving element are at opposite ends of the transport element; and the first driving element and the second driving element are driven independently.

14. The optical element driving mechanism as claimed in claim 13, wherein:

the first movable portion comprises a first resonance frequency;

the second movable portion comprises a second resonance frequency; and the first resonance frequency and the second resonance frequency are different.

15. The optical element driving mechanism as claimed in claim 14, further comprising:

a first magnetic element disposed on the first movable portion;

a first sensing element disposed on the fixed portion and corresponds to the first magnetic element;

a second magnetic element disposed on the second movable portion; and a second sensing element disposed on the fixed portion and corresponds to the second magnetic element.

16. The optical element driving mechanism as claimed in claim 15, wherein:

the first sensing element is used for detecting the position of the first movable portion relative to the fixed portion;

the second sensing element is used for detecting the position of the second movable portion relative to the fixed portion;

the first magnetic element and the first sensing element are arranged in the third direction; and the second magnetic element and the second sensing element are arranged in the third direction.

17. The optical element driving mechanism as claimed in claim 16, further comprising:

a second temperature sensing element corresponds to the second driving element and is used for detecting the temperature of the second driving element; and a circuit assembly embedded in the bottom.

18. The optical element driving mechanism as claimed in claim 17, wherein:

driving frequencies of the first driving element and the second driving element are identical; and the first driving element is electrically isolated from the second driving element.

* * * * *